United States Patent [19]

Wells

[11] 4,006,980

[45] Feb. 8, 1977

[54] MICROFICHE CARRIER

[75] Inventor: Thomas R. Wells, Des Plaines, Ill.

[73] Assignee: Bell & Howell Company, Chicago, Ill.

[22] Filed: Dec. 16, 1974

[21] Appl. No.: 532,798

[52] U.S. Cl. .............................. 353/118; 353/26 R; 353/27 R; 353/25

[51] Int. Cl.$^{2}$ .............................. G03B 23/00

[58] Field of Search ................ 353/118, 26, 25, 27; 206/215, 425, 449, 80.5; 40/159

[56] References Cited

UNITED STATES PATENTS

| | | | |
|---|---|---|---|
| 3,203,542 | 8/1965 | Lightner et al. | 206/45.31 |
| 3,324,918 | 6/1967 | Miller | 206/425 X |
| 3,480,356 | 11/1969 | Dimitracopoulus | 353/118 X |
| 3,797,925 | 3/1974 | Smitzer | 353/27 |
| 3,800,942 | 4/1974 | Hirata et al. | 353/25 X |
| 3,822,938 | 7/1974 | Hirsch | 353/121 |
| 3,869,201 | 5/1975 | Lysle | 353/27 R X |

*Primary Examiner*—Richard E. Aegerter
*Assistant Examiner*—Larry Jones
*Attorney, Agent, or Firm*—Robert A. Walsh

[57] ABSTRACT

A plastic microfiche carrier is made from two clear plastic sheets, which fit together in a face-to-face relationship to form an envelope that is open on one end and sealed on the other end and along two sides. One of the plastic sheets is embossed to provide a central clearance between the sheets for enabling insertion of a replaceable microfiche film. The clearance formed by the embossment on the other side enables the carrier to be slipped into a cartridge without binding in the thickness dimension. The corners of the carrier are tapered to facilitate an alignment of the microfiche library file within the cartridge. The edges of the carrier are notched to releasably hold the microfiche library film while it is inside the cartridge.

4 Claims, 4 Drawing Figures

MICROFICHE CARRIER

This invention relates to microfiche readers and more particularly to readers for automatically selecting and projecting images photocopied on microfiche, especially—although not exclusively—pre-loaded or pre-loadable in cartridges which may be inserted into the reader.

Microfiche film is a known form of graphic data presentation wherein a number of pages or images are photographically reproduced on a single flat "card" of microfiche film (such as a card of 3 inches × 5 inches to 4 inches × 6 inches, for example). Any suitable number of pages, (up to, say, a thousand or so) may be photographically formed in an orthogonal array on a single microfiche "card" of photographic film. The microfiche film may then be placed in an optical reader and moved over a rectilinear path until an image of a selected page is in an optical projection path leading to a display screen.

It is uneconomical to have a microfiche reader system for a single microfiche card; therefore, the user is likely to have an entire library file including many microfiche which must be kept in a specific order for quick recall. Therefore, it should be apparent that use of microfiche involves filing and storing in a library file, removal from the file, mechanical manipulation of the microfiche, and then refiling in the library file. Each microfiche must be found in the library file with little or almost no search, and then returned to the same spot in the library file to maintain the integrity of the library.

The mechanical manipulation of a microfiche involves sliding the microfiche into and out of the library file. Then, it must be placed in a carrier in the reader. Next, the carrier must be moved over a path in X and Y directions, until the selected image in the orthogonal array is in the optical path of a projector. Thereafter, the microfiche is removed from the reader and returned to the library file.

Human efforts lead to further problems. If manually kept, the microfiche library file is thumbed and soon becomes dog eared. Any grease on the fingers clouds the film and reduces the quality of the reproduced image. Human error may lead to misfiling and an effective loss of the microfiche. The manipulation of the microfiche within the reader could cause scratches on the film.

To avoid these and other problems, it is possible to maintain the microfiche library file in carriers mated to fit into cartridges such that only the cartridges need be touched by the operator. The mechanical microfiche reader equipment may be designed to manipulate the cartridge, to find and extract the desired microfiche carrier, and, after use, to return the carrier to its proper library file location within the cartridge. The combination of the carrier, cartridge, and reader includes means for finding and extracting one microfiche carrier from the library file and then reinserting it between many other microfiche carriers also filed in the cartridge. The problem is to find and select the desired one of the many carriers in the library file, to extract it without damage, to find and project the selected image, to find the spot in the library file for proper reinsertion of the carrier within the cartridge, to reinsert it without damage, and to safely retain the entire library file during storage, without danger of them falling from the cartridge.

Accordingly, an object of the invention is to provide new and improved microfiche carriers which overcome the aforementioned problems. Here, an object is to provide carriers which are mechanically strong and dimensionally stable to withstand manipulation in a cartridge. In particular, an object is to provide a reusable microfiche carrier which enables easy removal and replacement of microfiche.

In keeping with an aspect of the invention, these and other objects are accomplished by providing a plastic carrier made in two sheets which fit together to form an envelope. One of the plastic sheets is embossed to provide central clearance on one side for enabling an insertion of a friction-held microfiche film, and clearance on the other side for enabling a carrier to be slipped into a cartridge without thickness binding along the edges. The corners of the carrier are tapered to facilitate alignment of the microfiche file within the cartridge. The edges of the carrier are beveled to facilitate an insertion of the carrier into the cartridge and to reduce friction between the carrier and the sides of the cartridge. The edges of the carrier are also notched to enable both a holding of the microfiche film while it is inside the cartridge and a withdrawal of a microfiche from the cartridge.

The nature of a preferred embodiment of the invention may be understood best from a study of the attached drawing wherein.

Figure 3:
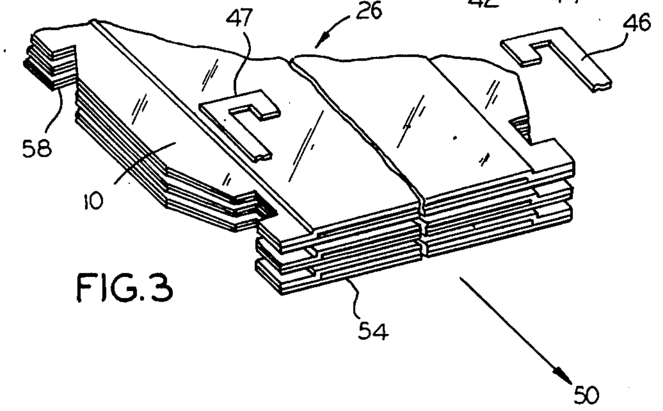
Figure 4:
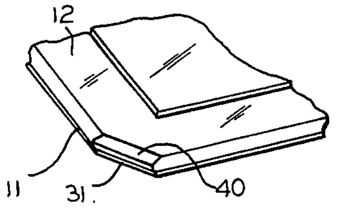

FIG. 3 schematically represents a library file of microfiche carriers located inside a cartridge; and FIG. 4 is a detail view of one tapered corner of the novel microfiche carrier.

In greater detail, the carrier 10 comprises two sheets 11, 12 of clear plastic, which may be any suitable transparent film. The plastic should be strong and dimensionally stable. These two sheets may be cemented or otherwise adhered together with a suitable adhesive above their sides and in a face-to-face relationship to form an envelope which is open on one end.

Figure 2:
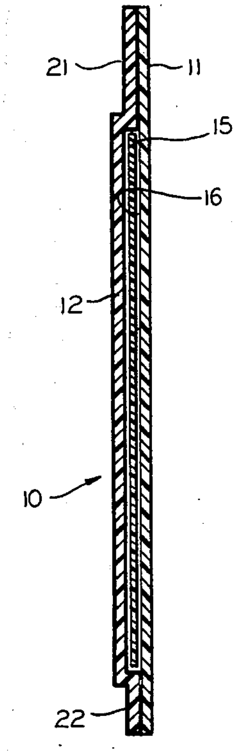
FIG. 2 is an edge view of the carrier taken along line 2–2 in FIG. 1.

Prior to assembly, one of the transparent carrier films 12 is embossed on three sides in a window area 13, 14 which substantially corresponds to the height and length of a microfiche film 15. As a result, the microfiche 15 slips into a clearance space 16 formed by the embossment (FIG. 2), where it is held by friction. The combination of the friction qualities of the plastic sheets forming the carrier 10, and the dimensions of space 16 permit the carrier to hold microfiche 15 in the space with enough frictional force to prevent its movement within the carrier, or its accidental removal from the carrier. Thereafter, each image, such as 17 (which may be a photocopy of a book page) may be viewed through the two plastic sheets forming carrier 10.

A recess or thumb space 20 is formed on the open end of the envelope so that the microfiche 15 may be gripped and pulled from the envelope. The remaining three sides of the envelope are sealed to complete the carrier 10. The parts of the embossment, which are outlined in heavy ink (FIG. 2), may be thought of as an L-beam which tends to strengthen and give dimensional stability to the carrier. Also, the somewhat depressed areas 21, 22 provide a clearance which enables the microfiche carrier 10 to slide more efficiently in a cartridge, and without binding at the edges.

The cartridge (not shown) into which carrier 10 is inserted includes small guides or shelves along the top and bottom internal edges so that a space is maintained between two adjacent microfiche carriers after the microfiche carrier 10 is extracted. This way, the microfiche carrier 10 has a space which it may enter when it is returned to the file.

Figure 1:
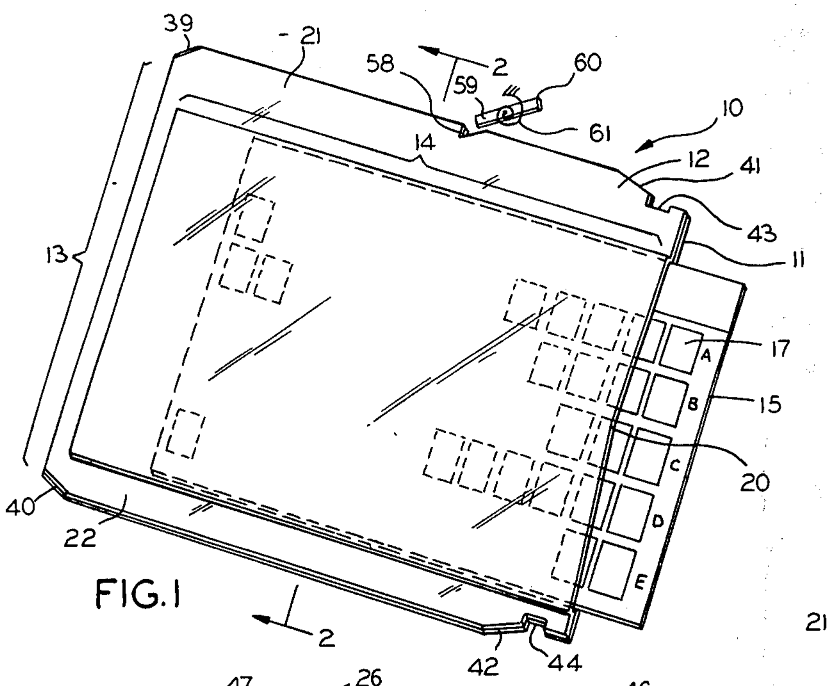
FIG. 1 is a perspective view of the inventive microfiche carrier and a fragment of a microfiche film inserted therein.

The end or corner of the microfiche carrier 10, which first enters the cartridge, are tapered at 39, 40 (FIGS. 1, 4). Hence, the carriers align themselves within the cartridge by engaging internal cartridge walls having a mating taper at the back of the cartridge.

The top and bottom corners 39, 40 (as viewed in FIG. 1) of each of the two carrier films 11, 12 are beveled in an opposite direction so that V-notches 31 (FIG. 4) are formed therein when the two transparent film sheets 11, 12 are cemented together.

The opposite end of the microfiche carrier 10 which is the end adapted to first leave the cartridge, is tapered at 41, 42 and notched at 43, 44 (FIG. 1). An extractor arm 46, 47 (FIG. 3) comprises hooks which engage the notches 43, 44 to grip and extract a selected one of the microfiche in the library file 26. Thus, for example, hooks 46, 47 may be lowered in notches 43, 44 where they will extract microfiche 10 from the library file 26 which is aligned with the hooks. When the hooks engage notches 43, 44, microfiche carrier 10 is pulled in direction 50. If the hooks 46, 47 are lowered through the vertically aligned notches in library file 26, and into notch 52 (and another notch not seen in FIG. 3), microfiche carrier 54 may be extracted from the file. Tapered portions 41, 42 permit the carrier 10 to readily slide between two glass flats forming part of the reader (not shown).

Each microfiche carrier has a notch 58 formed along one edge thereof (FIG. 1). One or more spring loaded latches (such as 59) is built into the cartridge to engage the notch 58 and releasably keep the microfiche firmly in the cartridge. The spring is numbered 61. When the cartridge is inserted into a microfiche reader, the arm 60 swings in a clockwise direction and latch 59 is swung to release the microfiche library file and enable an extraction of the selected microfiche carrier.

Briefly, each microfiche carrier 10 slips into a cartridge and rests between adjacent shelves or guides which hold the library file microfiche in a spaced parallel relationship. There is no rubbing of one carrier against another since the shelves in the cartridge hold the microfiche carriers apart. The embossed window area 13, 14 receives the microfiche film 15, which may be replaced quickly and easily. At 21, 22, the other side of the embossment provides a non-binding edge in the thickness dimension. End tapers and notches enable carrier alignment, extractor hook engagement, and microfiche latching. The microfiche carriers are reusable for updating the library in the cartridge.

Those who are skilled in the art will readily perceive various modifications which fall within the scope and the spirit of the invention. Therefore, the appended claims are to be construed to cover all equivalent structures.

I claim:

1. A microfiche film carrier for use in a library file which supports a plurality of microfiche carriers in a spaced parallel side-by-side relationship, with a latch for normally securing the carriers in the file, said carrier comprising: a pair of transparent film sheets, one of said sheets being embossed in a window area having dimensions substantially corresponding to dimensions of a microfiche film, means for adhesively securing said pair of film sheets along three edges in face-to-face relationship with said embossed window area forming a relief area for receiving a microfiche film, the edges of said embossed sheet forming a relief area to prevent thickness binding between said carrier and its adjacent supporting structure in a library file, hooks formed on at least one side of said carrier for enabling an extraction of a selected microfiche carrier from a library file, and a latch receiving keeper notch along at least one side of said carrier, whereby a library file latch engages the latch receiving keeper notch to hold the microfiche carrier in a library file.

2. The microfiche film carrier of claim 1 wherein said latch receiving keeper notch is shaped so that a spring biased latch automatically drops into and catches said notch when a microfiche carrier is inserted into a library file, and said notch being further shaped so that said carrier is released only when said latch is retracted, whereby said carrier may be released by moving a latch against a spring bias when a library file is inserted into a microfiche reader.

3. A microfiche film carrier for use in a library file which supports a plurality of microfiche carriers in a spaced parallel side-by-side relationship, with a latch for normally securing the carriers in the file, said carrier comprising: a pair of transparent film sheets, one of said sheets being embossed in a window area having dimensions substantially corresponding to dimensions of a microfiche film, means for adhesively securing said pair of film sheets along three edges in a face-to-face relationship with said embossed window area forming relief area for receiving a microfiche film, the edges of said embossed sheet forming a relief area to prevent thickness binding between said carrier and its adjacent supporting structure in a library file, said carrier being tapered on two corners in order to align said microfiche carrier as it is inserted within a library file, said tapered corners of each of said transparent sheets which first enter a library file being beveled to form a wedge shaped leading edge for guiding and directing said carrier.

4. A microfiche film carrier for use in a library file which supports a plurality of microfiche carriers in a spaced parallel side-by-side relationship, with a latch for normally securing the carriers in the file, said carrier comprising: a pair of transparent film sheets, one of said sheets being embossed in a window area having dimensions substantially corresponding to dimensions of a microfiche film, means for adhesively securing said pair of film sheets along three edges in a face-to-face relationship with said embossed window area forming a relief area for receiving a microfiche film, the edges of said embossed sheet forming a relief area to prevent thickness binding between said carrier and its adjacent supporting structure in a library file a fourth edge of said carrier being open with a thumb cutout so that a microfiche film may be gripped to be inserted in or pulled from said carrier, said carrier having four tapered corners to facilitate alignment of said carrier within a library file, a pair of opposing hooks formed on opposite sides of said carrier near said fourth edge for enabling an extraction of a selected carrier from a library file, at least one keeper notche formed on at least one side of said carrier for receiving a spring biased latch to hold the carrier in a library file, whereby a latch automatically catches said notch when a carrier is inserted into a library file, and means for releasing a latch by operating it against a spring bias when a library file is inserted into a microfiche reader.

* * * * *